United States Patent Office 2,876,241
Patented Mar. 3, 1959

2,876,241

PROCESS FOR THE PRODUCTION OF CARBOXYLIC ACIDS

Herbert Koch, Mulheim an der Ruhr, and Wilhelm Huisken, Essen, Germany, assignors to Studiengesellschaft Kohle mit beschränkter Haftung, a corporation of Germany No Drawing. Application May 12, 1955
Serial No. 507,998

Claims priority, application Germany May 15, 1954

12 Claims. (Cl. 260—413)

This invention relates to a process for the production of carboxylic acids.

The subject of patent application Serial No. 342,961, filed March 17, 1953, now Patent No. 2,831,877, is the production of carboxylic acids from olefines and carbon monoxide in the presence of catalysts such as sulphuric acid or hydrogen fluoride, the reaction initially being carried out in the liquid phase without the addition of water in the presence of catalysts which contain only a small amount of water or which if desired are even anhydrous, more especially catalysts such as at least 90% sulphuric acid, or anhydrous hydrogen fluoride by itself or with the addition of boron fluoride, whereupon the reaction product is then absorbed in water and worked up in known manner.

When using this method, at least three mols of sulphuric acid must be used for the reaction of 1 mol of olefine, and even 5 to 10 mols of sulphuric acid if particularly good yields of carboxylic acid are to be produced. These data apply as regards normal unbranched olefines, for example propene, n-butene and the two n-pentenes. With the branched olefines, for example with the iso-butene, the conditions are somewhat more favourable, that is to say, it is possible to manage with a smaller amount of sulphuric acid. When working with sulphuric acid, however, it is necessary to dilute strongly with water when the reaction is complete in order that the carboxylic acid formed may be separated from its mixture with the sulphuric acid. Consequently, it is necessary for large amounts of dilute sulphuric acid to be constantly re-concentrated. This concentration of sulphuric acid is made difficult or even quite impossible by the fact that hydroxysulphonic acids are formed on a more or less large scale as a secondary reaction in addition to the carboxylic acid synthesised. These hydroxysulphonic acids cannot easily be separated from sulphuric acid and, when the sulphuric acid is concentrated by evaporation, from a certain stage of concentration they cause carbonisation or tar formation of the acid with evolution of sulphur dioxide. Instead of a simple concentration process, it is therefore necessary in certain cases to envisage a complete regeneration of the sulphuric acid, and processes which have proved satisfactory from a technical point of view already exist for this purpose. However, it is not possible to avoid a considerable increase in the production costs due to these processes.

A large number of experiments have been conducted with the object of preventing the disturbing formation of hydroxysulphonic acids. In this connection, success has been achieved in substantially obviating the formation of hydroxysulphonic acid, particularly by using low reaction temperatures in the region of about −10° and lower. Nevertheless, the small amounts of hydroxysulphonic acid still being formed result in carbonisation of the sulphuric acid when it is being re-concentrated.

It has now been found that, whereas formerly it was necessary to dilute the reaction product with a large amount of water after the incorporation of the carbon monoxide when using concentrated sulphuric acid, the carboxylic acid obtained in a very good yield from olefines, preferably tertiary olefines, for example isobutent, 2-methyl pentene-1, 2-ethyl hexene-1 and other olefines branched on the double bond, can be separated smoothly without this dilution with water if the catalysts used consist of monohydroxy fluoboric acid H(BF₃OH) or its complex mixtures with inorganic acids, for example phosphoric acid or sulphuric acid. The reaction of the olefines proceeds exceptionally smoothly and quickly, and after the first part of the reaction, i. e. the incorporation of carbon monoxide, has been completed, it is sufficient if only that amount of water which is stoichiometrically necessary is added in order to effect the separation of the carboxylic acid from the catalyst, which can be used again. Accordingly, the present invention provides a process for the production of carboxylic acids from olefines, preferably olefines branched at the double bond, and carbon monoxide, in the presence of catalysts containing inorganic acids and boron fluoride, wherein the reaction is initially carried out in the liquid phase without the addition of water in the presence of a catalyst comprising monohydroxyfluoboric acid or a mixture thereof with phosphoric acid or sulphuric acid which contains no water or a small amount of water, and only then is the stoichiometric amount of water required for the reaction added.

These complex compounds of boron trifluoride with inorganic acids which are to be used in the process of the invention have already been described as suitable catalysts for the reaction of aliphatic alcohols with carbon monoxide to form organic acids. In this case, however, very strict working conditions are used and the operation is carried out at a temperature between 150 and 400° C. and a pressure between 25 and 900 atm. There is thus the possibility of introducing olefines instead of the alcohols. In this case, it is, however, essential that steam be added if acids are to be produced.

The complex compounds of boron trifluoride with inorganic acids, for example phosphoric acid, which are to be used in the process of the invention in the absence of water or in the presence of a small quantity of water, enable olefines, preferably olefines branched at the double bond, to be reacted with carbon monoxide to form carboxylic acids under very mild reaction conditions, such as temperatures which are advantageously at or below room temperature and pressures which are not higher than 100 atm. and which are preferably between 50 and 100 atm.

When using the process according to the invention, it is also possible to work at temperatures up to 100° C.

In accordance with one embodiment of the process of the invention, however, it is also possible for the carbon monoxide to be reacted at elevated pressure. By raising the carbon monoxide pressure within a pressure range between 100 and 600 atm., preferably between 100 and 300 atm., certain olefinic rearrangements are suppressed and advantageously "normal" carboxylic acids, i. e. those formed without re-arrangement, are produced in a simple manner. By raising the pressure of carbon monoxide, a reaction which is especially suppressed is the dimerisation of the olefines by means of which otherwise carboxylic acids of relatively high molecular weight are formed. Moreover, the migration of the methyl group is prevented, which migration would lead to the formation of mainly tertiary carboxylic acids instead of "normal" secondary carboxylic acids. The migration of the methyl groups, however, takes place mainly with unbranched olefines which do not carry any branching at the double bond. With this class of olefines, dimerisation does not play any part, while on the contrary the olefines branched at the double bond show a strong tendency to dimerisation and no migration of methyl groups takes places with these latter olefines.

The course of the reaction becomes particularly apparent by taking examples of the reaction of two isomeric pentenes: (a) the unbranched pentene-2, and (b) the 2-methyl butene-2 branched at the double bond.

(a) The "normal" reaction product of pentene-2 would be the two secondary $C_6$-carboxylic acids, α-methyl valeric acid (methyl-propyl-acetic acid) and α-ethyl butyric acid (diethyl-acetic acid).

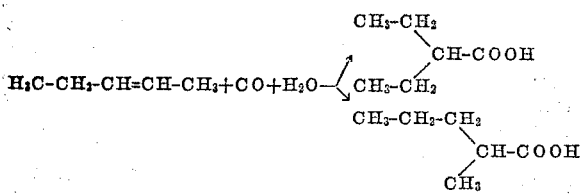

Owing to the migration of methyl groups, however, there is also formed a tertiary acid which in certain circumstances is even the main acid, namely α,α-dimethyl butyric acid (dimethyl ethyl acetic acid).

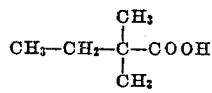

(b) The reaction product of the pentene isomer 2-methyl butene-2 branched at the double bond contains only the single tertiary α,α-dimethyl butyric acid as a $C_6$-carboxylic acid. With a low carbon monoxide pressure, however dimerisation to form a branched decene, which then reacts with carbon monoxide and produces a mixture of $C_{11}$-carboxylic acids, takes place.

It is possible initially to operate completely in the absence of water when using the process of the invention, although the presence of water is absolutely necessary according to the general reaction equation

Water can be added only after the reaction with carbon monoxide according to the process of the invention.

It is advantageous for the boron trifluoride-phosphoric acid catalyst to be prepared in known manner at an elevated temperature, for example about 100° C., that is to say, the boron trifluoride is introduced into, for example, 85% phosphoric acid at 100° C. until saturation is reached.

Tertiary olefines, that is to say, those which are branched at the double bond are, for example, capable of being reacted in a particularly smooth manner with boron trifluoride-phosphoric acid as catalyst.

As an example of the reaction of isobutene or 2-methyl pentene-1 with the boron trifluoride-phosphoric acid complex as catalyst, the operation of the process of the invention at low pressures will be described. For example, if a catalyst is used which has been obtained from 240 g. of 85% orthophosphoric acid by saturation at 100° C. with 225 g. of boron trifluoride, and is probably a mixture of 1 mol of monohydroxy fluoroboric acid $H(BF_3OH)$ and 2 mols of orthophosphoric acid, bound in a complex manner to $BF_3$, 6 mols of 2-methyl pentene-1 are in this case reacted in an autoclave at a temperature of approximately 4 to 10° C. and a carbon monoxide pressure of 75 to 100 atm. It is advantageous to force in about 1.5 mols of water after each 2 mols of olefine. The reaction proceeds at exceptionally high speed and the carbon monoxide pressure therefore does not fall any lower as the olefine is sprayed in. After the product has been removed from the autoclave, the residual amount of water which is theoretically necessary is then added so that altogether 6 mols of water have been added. A clear separation into a lower catalyst layer and an upper carboxylic acid layer is then immediately obtained, that is to say, without the addition of more water. The catalyst can be used again for further reactions. In contrast to the process in which concentrated sulphuric acid is used, no regeneration or re-concentration is necessary in this case. However, some boron fluoride always passes into the organic layer, but can easily be washed out with a small amount of water, this water used for washing purposes being sprayed into the autoclave with the next batch. The yields of carboxylic acid produced by the process of the invention are extremely good. It is readily possible to obtain 85% of total acid, of which again 80% consist of the $C_7$-carboxylic acid theoretically to be expected.

It is also possible to select other proportions of the constituents for the complex catalyst, for example by starting with 50% phosphoric acid which also is saturated with boron fluoride at 100° C. In such a case, about 4 mols of monohydroxy fluoboric acid $H(BF_3OH)$ are used to 1 mol of $H_3PO_4BF_3$. Even with this mixture, the reaction of, for example, 2-methyl pentene-1 with carbon monoxide proceeds quite smoothly. The working up is carried out as previously described.

Satisfactory results were also produced when using a catalyst consisting of monohydroxy fluoboric acid prepared by the saturation of water with boron fluoride while cooling with ice. On the other hand, concentrated phosphoric acid when used by itself proves to be completely inactive.

The combination of phosphoric acid and monohydroxy fluoboric acid is to be considered as equivalent to the mixture of sulphuric acid and boron fluoride.

When reacting 2-methyl pentene-1 with a catalyst which has been prepared from 85% sulphuric acid by saturation at 100° C. with boron trifluoride, good yields of carboxylic acids were likewise obtained in a rapid reaction. The method of operation in such a case was that always the catalyst recovered from the preceding batch or mixture was activated by adding a small amount of fresh catalyst. In this manner, in altogether 9 batches or mixtures, not less than 45 mols of 2-methyl pentene-1 (=3800 g.) could be reacted with 7.4 mols of $H_2SO_4$ (=737 g.) and 3.5 mols of $BF_3$ (=241 g.) with an average yield of 90% of carboxylic acids. After these 5 batches, the series of tests was broken off without there being any indication of abatement of the catalyst activity.

A method of carrying out the process of the invention in which the cost of catalyst is particularly advantageous consists in using a catalyst which does not consist solely of monohydroxy fluoboric acid (owing to the high cost of boron trifluoride) but contains, in addition to boron trifluoride, a less expensive material as the second component of the complex compound, for example orthophosphoric acid or sulphuric acid. In this connection, it is advantageous for the catalyst to contain only as much boron trifluoride as is necessary for producing an active $H_3PO_4$—$BF_3$ or $H_2SO_4$—$BF_3$ complex.

The following examples further illustrate the invention.

*Example 1*

1 litre of a complex mixture of phosphoric acid and monohydroxy fluoboric acid was introduced as catalyst into an autoclave with a magnetic stirrer mechanism and made of V4A-extra steel and a capacity of 5 litres. This catalyst was obtained by introducing gaseous boron fluoride at 100° C. into 85% phosphoric acid until the saturation point was reached, and had substantially the composition of $2(H_3PO_4.BF_3)+H(BF_3OH)$. After introducing carbon monoxide to give a pressure of 100 atm., 480 g. of isobutene (corresponding approximately to 8.5 mols) were injected by means of a pressure pump in the course of 5 hours, a reaction temperature of 5 to 10° C. being maintained in the autoclave. After each injection of 2 mols of isobutene, 1 mol (=18 g.) of water was also injected. When the absorption of carbon monoxide had ceased, the reaction product was removed and mixed with the residual amount of water (about 4 mols) which was still theoretically necessary. A separation into two layers then took place, and the lower catalyst layer formed was returned to the autoclave again, while the upper carboxylic acid layer was worked up together with the reaction products obtained in following batches.

6.8 kg. of a reaction product were obtained in the manner described in ten batches, from altogether 4.8 kg. of isobutene, which product yielded 6.2 kg. of carboxylic acids and also 600 g. of neutral oil after separation by way of the alkali metal salts. The carboxylic acids were subjected to fractional distillation in vacuo, and the main constituent was found to be 72.5% of trimethyl acetic acid (B. P.$_{.20}$ 76.5° C., M. P. 35.5° C.); 13% of $C_9$-acid and 14.5% of acids of higher molecular weight were also found.

*Example 2*

465 g. of the complex phosphoric acid-monohydroxy fluoboric acid catalyst described in Example 1 were placed in a V4A-extra autoclave equipped with magnetic stirring and having a capacity of 2 litres, and a carbon monoxide pressure of 75 atm. was maintained therein. With a reaction temperature of 5 to 10° C., 500 g. (about 6 mols) of 2-methyl pentene-1 were injected in an experimental time of 3 hours, 1.5 mols of water being introduced after each injection of 2 mols of olefine. As soon as the absorption of carbon monoxide was complete, the contents of the autoclave were removed and split up into a lower catalyst layer and an upper carboxylic acid layer by adding the residual amount of water which was still theoretically necessary. The separated catalyst was used again for another 4 batches, so that altogether 30 mols of 2-methyl pentene-1 were reacted. These 2.5 kg. of olefine yielded 3.9 kg. of a crude product from which the carboxylic acids were extracted with caustic potash solution and thereafter liberated again by hydrochloric acid. The yield of carboxylic acids amounted to 3.4 kg. and there was also 0.5 kg. of neutral oil. Fractional distillation in vacuo in a packed tower showed that α,α-dimethyl valeric acid (B. P.$_{.20}$=111° C., $n_D^{20}$=1.4210) in an amount of 75% formed the main constituent in the composition of the carboxylic acids, and that there were also 5% of fatty acids of lower molecular weight and 20% of fatty acids of higher molecular weight.

*Example 3*

540 g. of a mixture of phosphoric acid and monohydroxy fluoboric acid were introduced into a 2 litre V4A-extra autoclave with magnetic stirring means, the said mixture being formed from 50% phosphoric acid by introducing therein boron fluoride at 100° C. to the point of saturation. The composition of this catalyst was approximately as follows:

$$H_3PO_4 \cdot BF_3 + 4H(BF_3OH)$$

With a carbon monoxide pressure of 80 atm. and a reaction temperature of 5 to 10° C., 500 g. (6 mols) of 2-methyl pentene-1 were injected by means of a pressure pump in the course of 3 hours, 1.5 mols of water being introduced after each addition of 2 mols of olefine. When the absorption of carbon monoxide had ended, the reaction product was emptied out and worked up in the manner described in Examples 1 and 2. The catalyst recovered was used in three additional batches without it being possible to detect any diminution of the activity.

Altogether 2 kg. (24 mols) of 2-methyl pentene-1 were used and there were obtained therefrom 2.4 kg. of fatty acids. They consisted of 75% of α,α-dimethyl valeric acid (B. P.$_{.20}$=111° C., $n_D^{20}$=1.4210), 5% of fatty acids of lower molecular weight and 20% of fatty acids of higher molecular weight. 0.2 kg. of a neutral oil which was not further investigated was also obtained.

*Example 4*

A catalyst consisting of 430 g. of monohydroxy fluoboric acid prepared by saturating 90 g. of water (5 mols) with 340 g. of boron fluoride (5 mols) at 0° C. was used. 500 g. (6 mols) of 2-methyl pentene-1 were sprayed into a 2-litre V4A-extra autoclave with magnetic stirring means at a carbon monoxide pressure of 90 atm. and a reaction temperature of 0 to 5° C. over a period of 3 hours, 1 mol of water being introduced after each addition of 2 mols of olefine. When the absorption of carbon monoxide was complete, the reaction product was worked up in the manner already described in the earlier examples and the catalyst separated out was used for two further batches.

During the total conversion of 1.5 kg. (18 mols) of 2-methyl pentene-1, 1.8 kg. of fatty acids and 0.2 kg. of neutral oil were obtained. The carboxylic acids consisted of 70% of α,α-dimethyl valeric acid (B. P.$_{.20}$=111° C., $n_D^{20}$=1.4210), 8% of fatty acids of lower molecular weight and 22% of fatty acids of higher molecular weight.

*Example 5*

A complex mixture of sulphuric acid and monohydroxy fluoboric acid was prepared by introducing boron trifluoride into 340 g. of 85% sulphuric acid at 100° C. to the point of saturation, 95 g. (1.4 mol) of boron trifluoride being absorbed. 5 mols of 2-methyl pentene-1 were sprayed in the course of 3 hours at a temperature of 0 to 10° C. into a 2 litre V4A-extra autoclave with magnetic stirring means, the said autoclave being filled with 435 g. of the above-described catalyst and having a carbon monoxide pressure of 80 atm. maintained therein. 1 mol of water was injected after each addition of 2 mols of olefine. As soon as the absorption of carbon monoxide was complete, the reaction product was emptied out and worked up as described in the earlier examples. The catalyst recovered was used for another 8 batches, and in order to maintain a constant activity an amount of 90 g. of fresh catalyst was added before each fresh batch and a corresponding amount of the used catalyst was withdrawn.

From altogether 45 mols (3.8 kg.) of 2-methyl pentene-1, 4.8 kg. of carboxylic acids were obtained, and the composition of these acids was determined by fractional distillation in vacuo. The main constituent consisted of 70% of α,α-dimethyl valeric acid (B. P.$_{.20}$=111° C., $n_D^{20}$=1.4210). There were also found 5% of fatty acids of lower molecular weight and 25% of fatty acids of higher molecular weight. The amount of neutral oil was 150 g.

*Example 6*

460 g. of a catalyst having the composition $$2(H_3PO_4 \cdot BF_3) + H(BF_3OH)$$

were placed in a 2 litre V4A-extra autoclave and 4 mols (450 g.) of 2-ethyl hexene-1 were forced in over a period of 4 hours at a temperature of 5 to 10° C. and at a carbon monoxide pressure of 50 atm.

1 mol of water was injected after each 2 mols of olefine. When the product was worked up in the usual manner, 532 g. of carboxylic acids and 55 g. of neutral oil were obtained. Fractional distillation in vacuo showed that the carboxylic acids consisted of 62% of $C_9$-acids (B. P.$_{.10}$=125.5° C., $n_D^{20}$=1.4334), and there were also 8% of fatty acids of lower molecular weight and 30% of fatty acids of higher molecular weight.

*Example 7*

An isododecene obtained by dimerisation of 2-methyl pentene-1 was used as starting material. The catalyst used for this dimerisation was the same complex of phosphoric acid and monohydroxy fluoboric acid as was subsequently used for the carbon monoxide reaction. The isododecene was a mixture of substantially 3 isomeric trimethyl nonenes.

The olefine was reacted with carbon monoxide in a 2 litre V4A-extra autoclave which was charged with 460 g. of the complex phosphoric-acid-monohydroxy fluoboric acid catalyst, prepared by saturating 85% phosphoric acid with boron fluoride at 100° C. During the introduction of the dodecene, the carbon monoxide pressure was 80 atm. and the temperature 5 to 10° C. Altogether 4 mols (i. e. 672 g.) of olefine were introduced in each batch and 1 mol of water was sprayed in after each 2 mols of olefine.

The product was worked up as in the preceding examples. The catalyst was used for another two reactions without any decrease in its activity being observed.

2.46 kg. of carboxylic acids and 100 g. of neutral oil were obtained from altogether 12 mols=2016 g. of dodecene. Fractional distillation of the carboxylic acids in vacuo showed a composition corresponding to 25% of $\alpha,\alpha$-dimethyl valeric acid (B. P.$_{.20}$=111° C., $n_D^{20}$=1.4210) and 65% of $C_{13}$-carboxylic acid (B. P.$_{.10}$=163° C., $n_D^{20}$=1.4515) and also 10% of acids with a different number of carbon atoms.

*Example 8*

The olefine used as starting material consisted of 2-methyl pentene-1, which was reacted at different carbon monoxide pressures. The catalyst consisted of complex mixtures of boron fluoride with sulphuric acid or phosphoric acid which had been obtained by saturating 85% acids at 100° C. with boron fluoride. The following table shows the results which were obtained with these catalysts, in one case with a carbon monoxide pressure of 100 atm. and in the other of 300 atm. The raising of the pressure resulted in a pronounced reduction of the dimerisation and thus in the formation of $C_{13}$-carboxlic acids.

| Catalyst | Carbon monoxide pressure, atm. | Total yield, percent | Yield of carboxylic acids (Percentage of total yield), valeric acid | Carboxylic acid |
|---|---|---|---|---|
| $BF_3$—$H_2SO_4$ | 100 | 89 | 69 | 31 |
|  | 300 | 90 | 85 | 15 |
| $BF_3$—$H_3PO_4$ | 100 | 85 | 80 | 20 |
|  | 300 | 86 | 91 | 9 |

What we claim is:

1. In the process for the production of carboxylic acids by reaction of an olefin with carbon monoxide in the presence of a catalyst, the improvement, facilitating catalyst recovery for reuse, which comprises effecting said reaction by contacting an olefin, having a branched chain at a double bond carbon atom, in the liquid phase with carbon monoxide at a temperature between about —10° and 100° C. under substantially anhydrous condition in the presence of a substantially anhydrous catalyst selected from the group consisting of monohydroxyfluoboric acid, monohydroxyfluoboric acid mixed with phosphoric acid and monohydroxyfluoboric acid mixed with sulfuric acid, and thereafter adding water to the reaction mixture forming a layer containing the formed carboxylic acid, and a separate layer containing separated catalyst suitable for direct reuse.

2. Improvement according to claim 1 in which stoichiometric quantity of water is added.

3. Improvement according to claim 1 in which said contacting is effected by maintaining said catalyst in a reaction zone, intermittently adding said olefin to said reaction zone in batches for contact with said carbon monoxide, adding a quantity of water in a molar ratio to said olefin of 1–1.5:2 after the addition of each batch of olefin, and after the total quantity of olefin has been added, adding an amount of water to make up approximately the stoichiometric quantity.

4. Improvement according to claim 1 in which said contacting is effected at a temperature between about 0 and 10° C.

5. Improvement according to claim 1 in which said contacting is effected at an elevated pressure below about 100 atmospheres.

6. Improvement according to claim 1 in which said contacting is effected at a pressure between about 100 and 600 atmospheres.

7. Improvement according to claim 1 in which said catalyst is a catalyst formed by saturating phosphoric acid with boron trifluoride.

8. Improvement according to claim 1 in which said catalyst is a catalyst formed by saturating sulfuric acid with boron trifluoride.

9. Improvement according to claim 1 in which said catalyst is a catalyst formed by saturating phosphoric acid having a 50–85% concentration with boron trifluoride.

10. Improvement according to claim 1 in which said catalyst is a catalyst formed by saturating sulfuric acid having a 50–85% concentration with boron trifluoride.

11. Improvement according to claim 1 in which said catalyst is a catalyst formed by saturating phosphoric acid with boron trifluoride at a temperature of about 100° C.

12. Improvement according to claim 1 in which said catalyst is a catalyst formed by saturating sulfuric acid with boron trifluoride at a temperature of about 100° C.

References Cited in the file of this patent
UNITED STATES PATENTS

| | | |
|---|---|---|
| 2,135,459 | Loder | Nov. 1, 1938 |
| 2,593,440 | Hagemeyer | Apr. 22, 1952 |

FOREIGN PATENTS

| | | |
|---|---|---|
| 518,682 | Belgium | Apr. 15, 1953 |